United States Patent [19]

Hicks

[11] Patent Number: 4,736,657

[45] Date of Patent: Apr. 12, 1988

[54] ADJUSTING TOOL

[75] Inventor: Irwin A. Hicks, Radnor, Pa.

[73] Assignee: American Meter Company, Philadelphia, Pa.

[21] Appl. No.: 924,955

[22] Filed: Oct. 30, 1986

[51] Int. Cl.$^4$ .......................... B25B 23/00; G01F 3/22
[52] U.S. Cl. ..................................... 81/57.31; 81/440; 81/451; 81/461
[58] Field of Search .................. 81/52, 55, 56, 57.31, 81/437, 440, 451, 460, 461, 462; 73/281

[56] References Cited

U.S. PATENT DOCUMENTS

| | | | |
|---|---|---|---|
| 1,937,045 | 12/1933 | Fegley et al. | 81/57.31 |
| 3,127,798 | 4/1964 | Gol | 81/439 |
| 3,935,761 | 2/1976 | Junkel et al. | 81/55 |
| 4,358,971 | 11/1982 | Favonio | 81/55 |
| 4,520,676 | 6/1985 | Hicks | 73/281 |

Primary Examiner—Frederick R. Schmidt
Assistant Examiner—William E. Terrell
Attorney, Agent, or Firm—David L. Davis

[57] ABSTRACT

An adjusting tool for use with an adjustable tangent assembly in a diaphragm gas meter includes a pair of coaxial tubes each having a face gear at one end, with operator manipulatable handles directly on the tubes so that an in-line configuration is attained.

9 Claims, 2 Drawing Sheets

ADJUSTING TOOL

BACKGROUND OF THE INVENTION

This invention relates to an improved adjusting tool for use with an adjustable tangent assembly in a diaphragm gas meter.

An adjustable tangent assembly for a diaphragm gas meter is disclosed in U.S. Pat. No. 4,520,676, which issued on June 4, 1985, to Irwin A. Hicks and Charles W. Albrecht, the contents of which are hereby incorporated by reference herein. As disclosed therein, the adjustable tangent assembly is provided with a pair of concentric face gears coaxial with the axis of rotation of the crank shaft and accessible through a small plug hole in the meter cover. An adjusting tool is disclosed for insertion through the plug hole to allow independent self-locking adjustment of the timing and stroke with high resolution. The disclosed adjusting tool includes first and second concentric tubes having face gears at their free ends and first and second adjusting knobs extending at right angles to the tubes and engaging the tubes with respective bevel gears to turn the respective tubes. While satisfactory in operation, the disclosed adjusting tool is disadvantageous due to the number of parts required, difficulty of assembly, and cost.

Accordingly, it is an object of the present invention to provide an improved adjustment tool.

SUMMARY OF THE INVENTION

The foregoing, and additional, objects are attained in accordance with the principles of this invention by providing an adjusting tool for use with an adjustment mechanism having a pair of coaxial adjusting elements each with a respective face gear fixedly secured thereto, the face gears being concentric, the tool comprising a holder block having a central opening surrounded by four sides with a bore through one of the sides, a first tube having a first gear at one end thereof adapted to engage a first of the adjusting element face gears, the first tube extending through the bore with the one end remote from the holder and its other end within the central opening, the other end having secured thereto and accessible through the central opening first operator manipulatable means for enabling an operator to rotate the first tube about its longitudinal axis, and a second tube having a face gear at one end thereof adapted to engage the other of the adjusting element face gears, the second tube being coaxial with and internal to the first tube and having secured to its other end and accessible through the central opening second operator manipulatable means for enabling an operator to rotate the second tube about its longitudinal axis, wherein the first and second operator manipulatable means is each independently rotatable about the longitudinal axis of the first and second tubes.

BRIEF DESCRIPTION OF THE DRAWINGS

The foregoing will be more readily apparent upon reading the following description in conjunction with the drawings wherein.

DESCRIPTION

Figure 1:
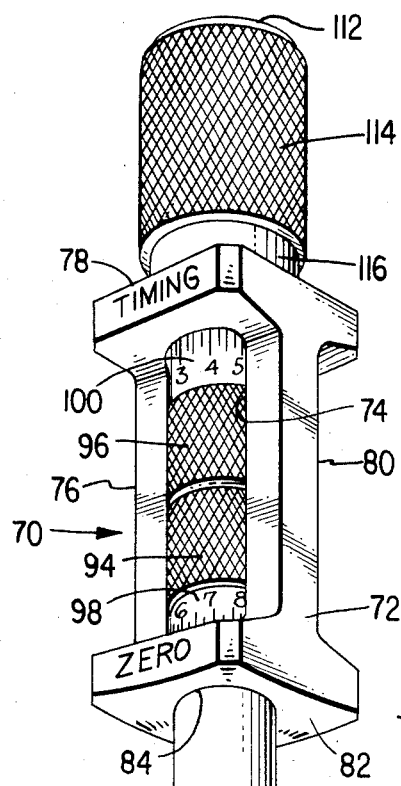
FIG. 1 is a perspective view showing an adjustable tangent assembly for a diaphragm gas meter and the inventive tool for use therewith.
Figure 1:
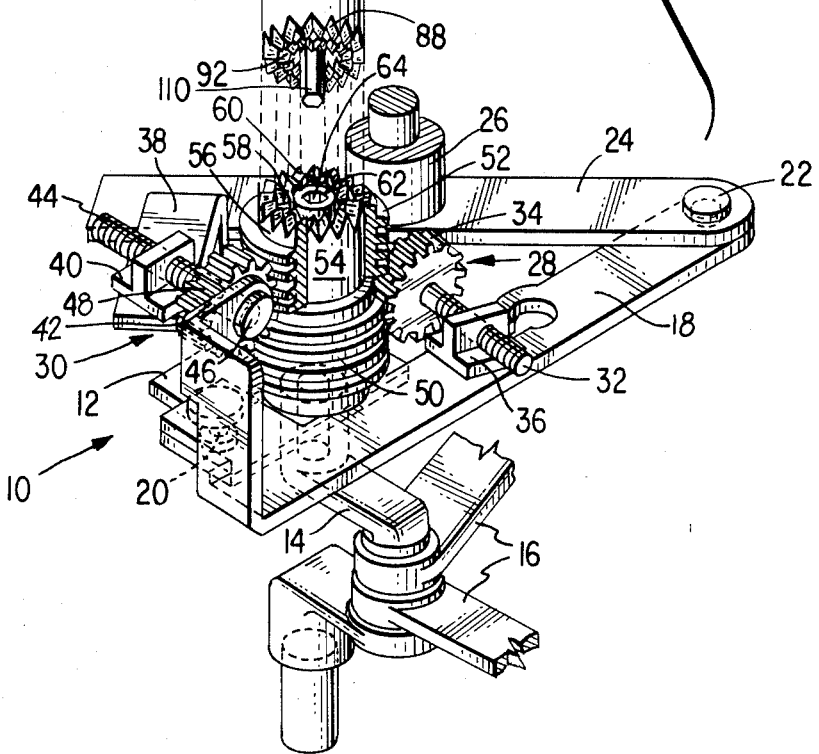
Figure 2:
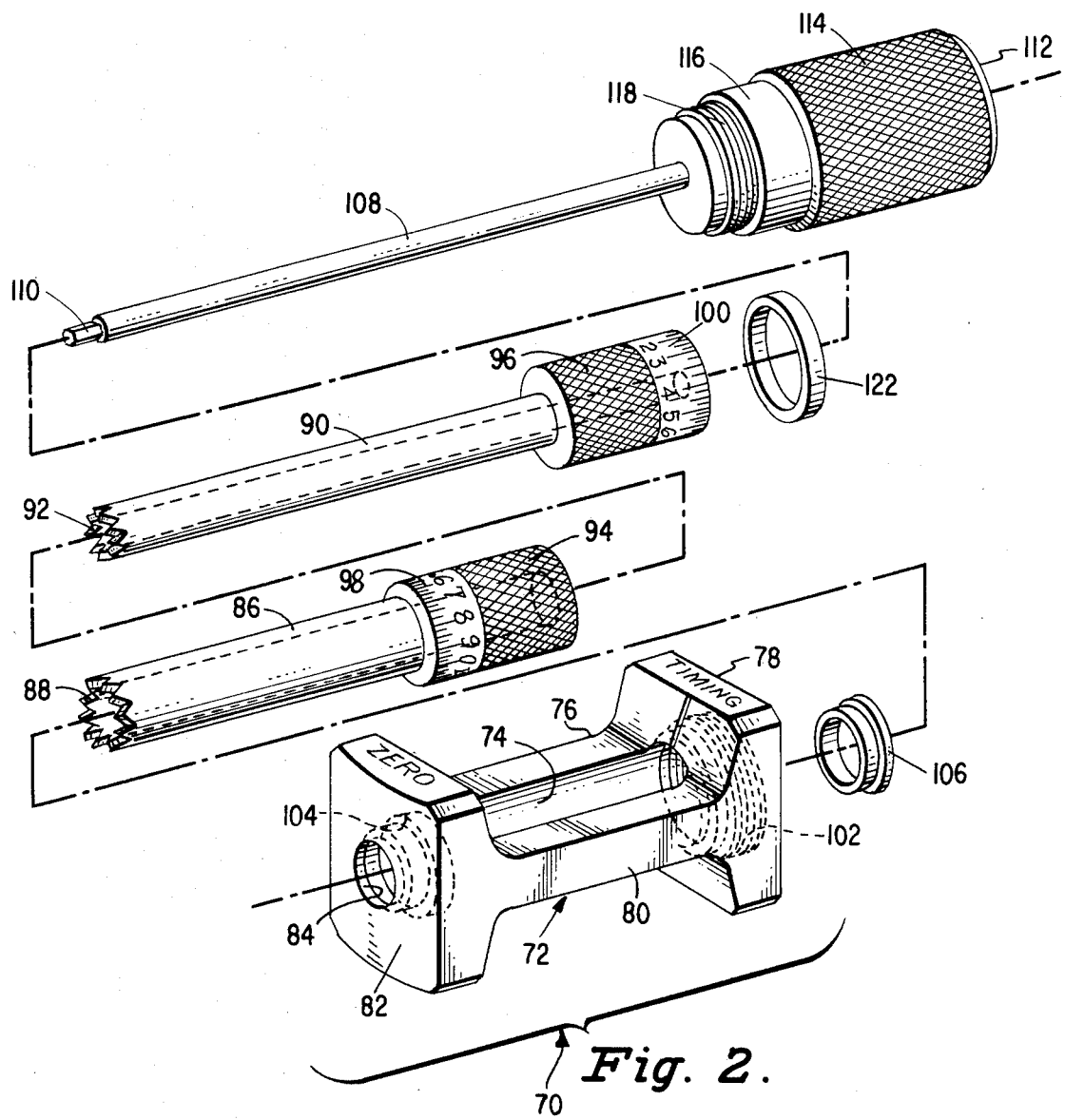
FIG. 2 is an exploded perspective view of the adjusting tool shown in FIG. 1.

Referring now to the drawings, wherein like elements in different figures thereof have the same reference character applied thereto, FIG. 1 shows an adjustable tangent assembly for a diaphragm gas meter, designated generally by the reference numeral 10, of the type fully disclosed in the referenced U.S. Pat. No. 4,520,676. The assembly 10 includes a lock plate 12 nonrotatably connected to the crankshaft 14 having the usual crank connected by the arms 16 to the meter values (not shown). A timing plate 18 is pivotally connected to the lock plate 12 by a pivot pin 20. At the other end of the timing plate 18, a second pivot pin 22 provides a pivotal connection between the timing plate 18 and a stroke plate 24. The stroke plate 24 has fixedly connected thereto a wrist pin 26, to which are connected the flag arms (not shown) of the diaphragm meter.

To provide a rigid, but adjustable, connection between the lock plate 12, the timing plate 18 and the stroke plate 24, there is provided a first connecting mechanism 28 and a second connecting mechanism 30. The first connecting mechanism 28 includes a threaded shaft 32 having a gear 34 affixed thereto. The shaft 32 is threaded into an adjusting block 36 mounted on, or part of, the timing plate 18, the adjusting block 36 having an internally threaded through bore for accommodating the threaded shaft 32. The other end of the threaded shaft 32 is secured to the lock plate 12 by an upstanding tab (not shown) having an opening therethrough through which the shaft 32 may extend and in which the shaft 32 may freely rotate, the shaft 32 being provided with a head or snap ring larger than the opening in the upstanding tab. The second connecting mechanism 30 is similar to the first connecting mechanism 28 and provides a connection between the timing plate 18 and the stroke plate 24. Accordingly, the stroke plate 24 is formed with an extension 38 on which is mounted the adjusting block 40 and the timing plate 18 is formed with a tab 42. The second connecting mechanism 30 also includes a threaded shaft 44 having a head 46 at one end thereof. The adjusting block 40 has an internally threaded opening into which the shaft 44 may be screwed and the tab 42 has an opening, smaller than the head 46, in which the shaft 44 may freely rotate. Press fit onto a knurled portion of the shaft 44 is a gear 48. Thus, when the gear 34 is rotated, the timing plate 18 is pivoted with respect to the lock plate 12 about the pivot pin 20 and, when the gear 48 is rotated, the stroke plate 24 is pivoted with respect to the timing plate 18 about the pivot pin 22. Thus, the position of the wrist pin 26 may be controlled.

In order to turn the gears 34 and 48 to independently vary the stroke and timing, there is provided a first worm 50 engaged with the gear 34 and a second worm 52 engaged with the gear 48. The worms 50 and 52 are coaxial, with each having an integral extension 54 and 56, respectively, the ends of which are formed as a pair of concentric face gears 58 and 60, respectively. The worms 50 and 52 are free to rotate with respect to each other and are held in place by a threaded locking screw 62 having a recessed hexagonal socket 64 and secured to the crank shaft 14. The foregoing is fully described in the referenced U.S. Pat. No. 4,520,676.

According to the present invention, there is provided an improved tool, designated generally by the reference numeral 70, for effecting adjustment of the tangent assembly 10. The tool 70 includes a holder block 72 having a central opening 74 surrounded by four sides 76, 78, 80 and 82, with the side 82 having a bore 84 therethrough. The tool 70 includes a first tube 86 having a face gear 88 at one end adapted to engage the face gear 60 and a second tube 90 having a face gear 92 at one end adapted to engage the face gear 58. At the other end of the first tube 86 is an operator manipulatable handle portion 94 which is preferably knurled for ease in manipulation. Similarly, at the other end of the second tube 90, there is provided an operator manipulatable handle portion 96 which is also preferably knurled. Adjacent the handle portions 94 and 96 are scale portions 98 and 100, respectively, which can be used by the operator to keep track of the number, or fraction thereof, of turns of the tubes 86 and 90.

Figure 3:
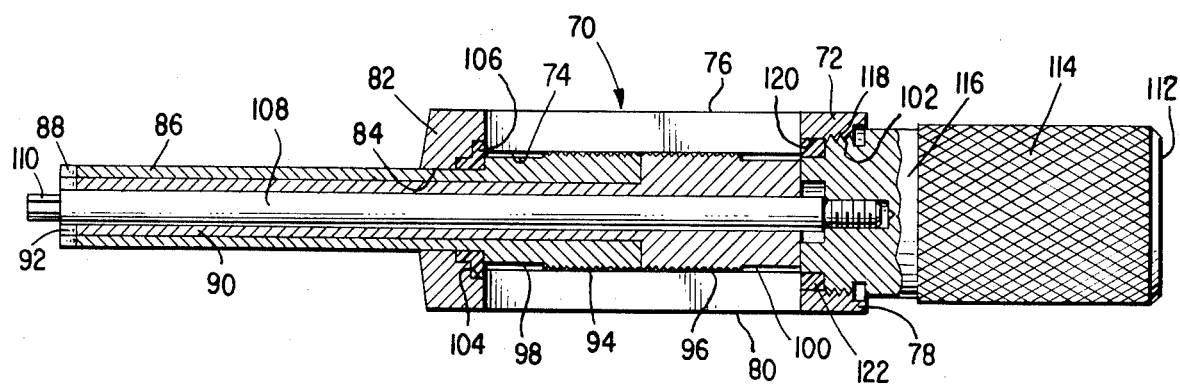
FIG. 3 is a longitudinal cross sectional view of the tool shown in FIGS. 1 and 2.

The side 78 of the holder block 72 is formed with an enlarged bore 102 through which tubes 86 and 90, along with their handle portions 94 and 96, may be inserted. As may be seen from FIG. 3, the tube 90 is internal to the tube 86, with the lengths of the tubes 86 and 90 being so arranged that the face gears 88 and 92 are substantially in alignment. The bore 84 is smaller than the handle portion 94 and is counterbored at 104 for holding a nylon bushing 106.

As disclosed in the referenced patent, when an adjustment is being made to the tangent assembly 10, the crankshaft 14 may be prevented from rotating. Accordingly, there is provided a hexagonal socket 64 fixedly secured to the crankshaft 14, and the tool 70 is provided with a locking shaft 108 having a projection 110 shaped complemental to the socket 64. At the end opposite the projection 110, the locking shaft 108 is threadedly or solidly secured to a handle member 112. The handle member 112 preferably has a knurled portion 114 and a cylindrical portion 116 having external threads 118. The bore 102 is accordingly formed with internal threads 120 for securely holding the handle member 112. A nylon bushing 122 is provided in the bore 102, against which the handle member 112 is seated.

Accordingly, there has been disclosed an improved adjusting tool for use with an adjustable tangent assembly in a diaphragm gas meter. This tool is advantageous in that it is easy to assemble and comprises a small number of parts. It is understood that the above described embodiment is merely illustrative of the application of the principles of this invention. Numerous other embodiments may be devised by those skilled in the art without departing from the spirit and scope of this invention, as defined by the appended claims.

I claim:

1. An adjusting tool for use with an adjustment mechanism having a pair of coaxial adjusting elements each with a respective face gear fixedly secured thereto, said face gears being concentric, the tool comprising:

a holder block having a central opening surrounded by four sides with a bore through one of said sides;

a first tube having a face gear at one end thereof adapted to engage a first of the adjusting element face gears, said first tube extending through said bore with said one end remote from said holder and its other end within said central opening, said other end having secured thereto and accessible through said central opening a first operator manipulatable handle for enabling an operator to rotate said first tube about its longitudinal axis; and a second tube having a face gear at open end thereof adapted to engage the other of the adjusting element face gears, said second tube being coaxial with and internal to said first tube and having secured to its other end and accessible through said central opening a second operator manipulatable handle for enabling an operator to rotate said second tube about its longitudinal axis;

wherein said first and second operator manipulatable handles are rotatable independently from each other about the common longitudinal axis of said first and second tubes and comprise longitudinally aligned cylindrical gripping surfaces.

2. The tool according to claim 1 further including a handle member fixedly secured to said holder block on the side opposite the side containing said bore.

3. The tool according to claim 1 for use with said adjustment mechanism which further includes engageable means for providing a holding surface concentric with and radially inward from said face gears, said tool further including means for engaging said engageable means comprising a shaft fixedly secured to said holder block on the side opposite the side containing said bore and extending within said second tube.

4. The tool according to claim 3 further including a handle member fixedly secured to said holder block on the side opposite the side containing said bore.

5. The tool according to claim 4 wherein said shaft is mounted on said handle member.

6. The tool according to claim 5 wherein said holder block is formed with a second bore on said opposite side, said second bore is internally threaded, and said handle member includes a cylindrical portion having external threads for threadingly securing said handle element in said second bore.

7. The tool according to claim 6 wherein said shaft is mounted on an end of said cylindrical portion of said handle member so as to extend through said first and second bores.

8. The tool according to claim 1 wherein said first operator manipulatable handle is formed integral with said first tube and said second operator manipulatable handle is formed integral with said second tube.

9. The tool according to claim 1 wherein said gripping surfaces are enlarged knurled portions of said tubes.

* * * * *